United States Patent [19]
Gatland et al.

[11] 3,858,452
[45] Jan. 7, 1975

[54] EMERGENCY RELEASE FOR SCREW DRIVE OPERATOR TRAVELER ASSEMBLY

[75] Inventors: Geoffrey H. Gatland, Walled Lake, Mich.; Kenneth L. Robitaille, Windsor, Ontario, Canada

[73] Assignee: Vemco Products, Inc.,, Detroit, Mich.

[22] Filed: July 9, 1973

[21] Appl. No.: 377,615

[52] U.S. Cl............. 74/89.15, 74/405, 74/424.8 R, 74/424.8 A, 49/139, 49/199
[51] Int. Cl............................................ F16h 27/02
[58] Field of Search ............ 49/139, 199, 358, 359, 49/362, 340, 343; 74/424.8, 405, 459, 89.15

[56] References Cited
UNITED STATES PATENTS
| | | | |
|---|---|---|---|
| 3,051,014 | 8/1962 | Houk | 49/139 X |
| 3,069,151 | 12/1962 | Cook et al. | 49/139 X |
| 3,220,718 | 11/1965 | Wikkerink | 49/139 X |
| 3,235,246 | 2/1966 | Cowan | 49/139 |

*Primary Examiner*—Kenneth Downey
*Attorney, Agent, or Firm*—Thomas N. Young

[57] ABSTRACT

A screw-shaft type power operator for garage doors and other bidirectionally movable loads including an extruded aluminum rail defining a channel for the screw shaft and immediately adjacent the channel an opposed hollow flange arrangement defining inner and outer traveler tracks. An inner traveler is disposed substantially within the rail and includes a trapped nut meshing with the screw shaft for linear displacement along the rail upon rotation of the screw shaft. An outer traveler body encloses the lower portion of the rail for sliding engagement therewith and is capable of sliding over and past the inner traveler in both directions. A latch carried by the outer traveler and spring biased into a vertically-extending slot in the inner traveler mechanically interconnects the two travelers but is capable of being withdrawn from engagement with the inner traveler so as to permit free manual operation of the garage door while still connected to the outer traveler. A bearing liner of polygonal cross-sectional configuration is disposed between the screw shaft and the screw shaft channel to reduce wear and noise upon operation of the screw shaft.

18 Claims, 7 Drawing Figures

Patented Jan. 7, 1975

Patented Jan. 7, 1975
3,858,452
2 Sheets-Sheet 2
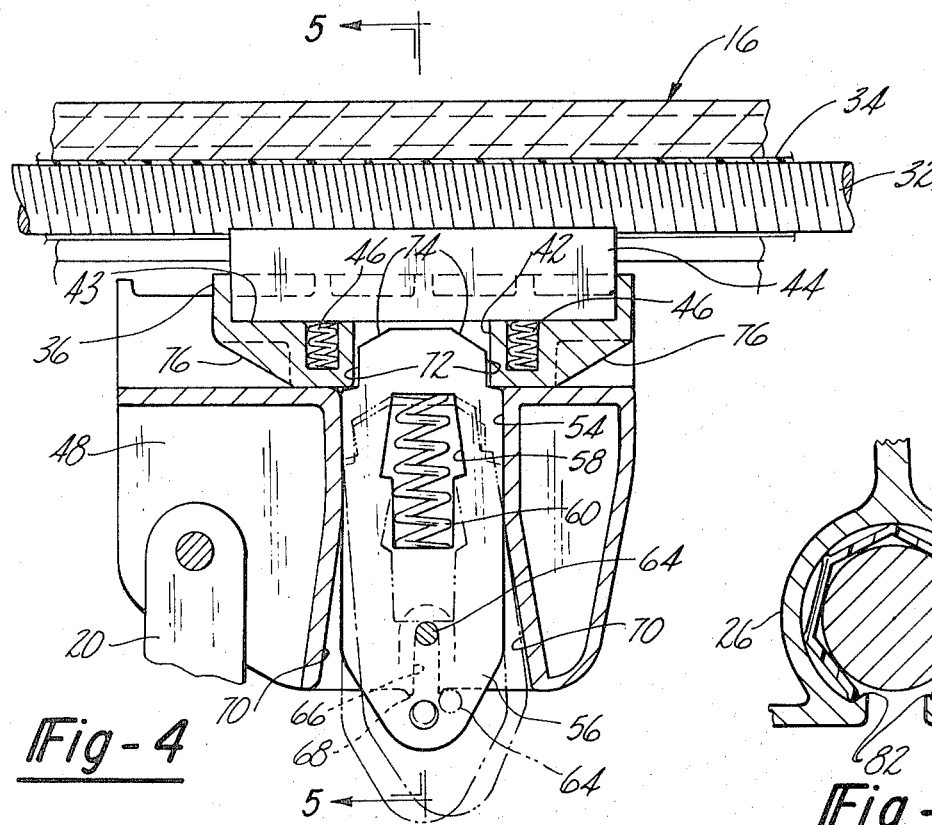
Fig-4
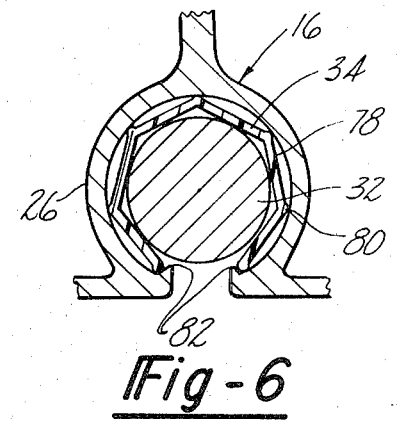
Fig-6
Fig-7
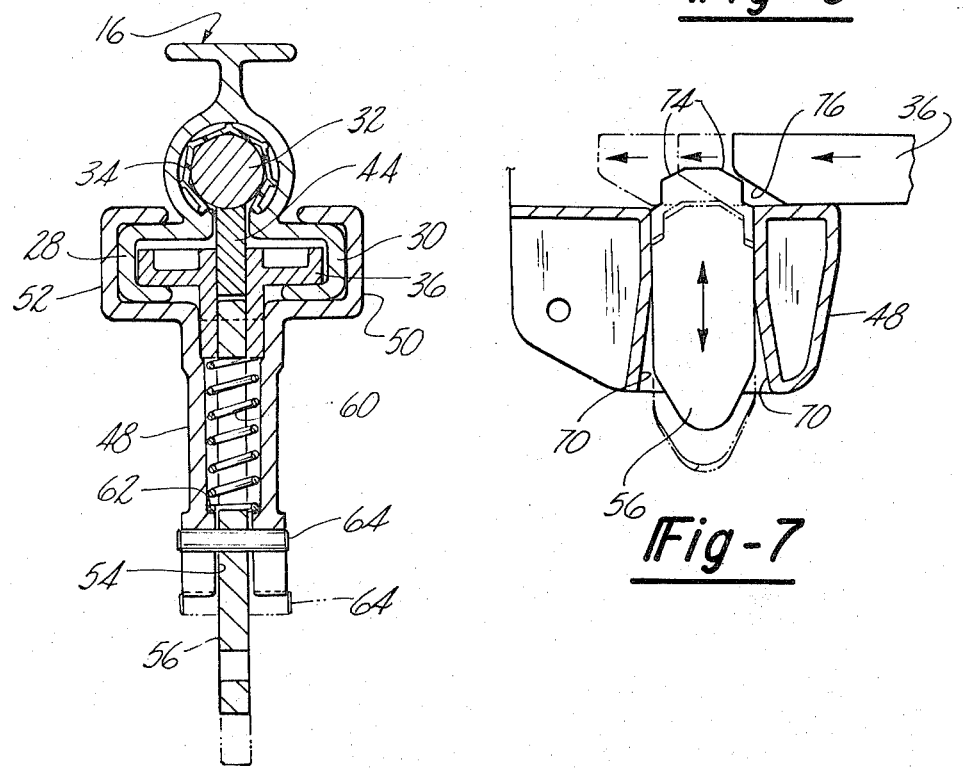
Fig-5

EMERGENCY RELEASE FOR SCREW DRIVE OPERATOR TRAVELER ASSEMBLY

INTRODUCTION

This invention relates to power driven operators for garage doors and the like and particularly to an operator of the type having an elongated rotatable screw shaft as part of the drive assembly.

BACKGROUND OF THE INVENTION

Automatic, power-driven operators for garage doors and the like are becoming increasingly popular for the convenience and security which they offer in both domestic and industrial applications. One type of garage door operator comprises a motor, an elongated rail or track, a traveler associated with the track, and a chain or chain-cable combination which is driven by the motor to move the traveler between its limits of travel along the rail. The garage door or other load to be moved is typically connected to the traveler by means of an arm having a manually operable release mechanism therein such that the door may be detached from the traveler in the event of a power failure or breakdown of the operator system. Once the door is disconnected from the traveler, the door can be opened and closed manually. One of the problems with this type of release mechanism is that it is not easily reconnected if the breakdown or power failure occurs in a part-open condition of the door.

Another popular form of garage door operator comprises a motor which drives a long screw shaft rotatably disposed in a rail or track and connected to a traveler by means of a trapped nut. Once such device is illustrated in the United States Patent to Cowan, U.S. Pat. No. 3,235,246. The Cowan device discloses a track or rail and a pair of travelers disposed on the rail, one of which is connected to the screw shaft and the other of which is connected to the door. The two travelers are mechanically interconnected in a releasable fashion so as to permit manual operation of the door in the event of an operator failure. The Cowan device, however, is designed to permit relative displacement between the two travelers only in a direction which permits the door to be opened; i.e., it is assumed that the operator failure occurs when the door is in the closed position. The two travelers cannot pass one another in both directions and, accordingly, a power failure with the door in a partly or fully opened position requires that the door remain open until the operator is again working. To close the door otherwise requires that a substantial portion of the Cowan system be dismantled.

BRIEF STATEMENT OF THE INVENTION

In accordance with the present invention, a traveler assembly for a screw-type operator for garage doors and the like is provided wherein a track or rail lying along the path of travel of the load carries first and second travelers, one of the travelers being connected to be driven by the screw shaft and the other of the travelers being connected to drive the load. The two travelers, when disengaged from one another, can pass each other in either direction, thus, to permit the load to be manually displaced in either direction upon failure of the power driven operator. In general, this is accomplished by the provision of a rail defining inner and outer tracks, an inner traveler which is substantially permanently in engagement with the screw shaft and linearly displaceable along the inner track, an outer traveler which may be substantially permanently connected to the door and which is disposed on the outer track for linear displacement thereover, the outer traveler being constructed and arranged so as to pass over the inner traveler in either direction so as to be capable of fully independent, bidirectional movement along the rail. In addition, a selectively operable latch device is carried by the outer traveler and susceptible of displacement between a first position which is in interfering engagement with the inner traveler thereby to effectively lock the two travelers together, and a second position which is out of the interfering relationship, thus, to permit the two travelers to move independently of one another.

A further feature of the subject invention is the facility for automatically interconnecting the inner and outer travelers following a period of manual operation of the door or other load to which the subject device is connected. In general, this results from the design of the operator and traveler assembly to permit the inner and outer travelers to remain functionally engaged with the respective track portions of the guide rail at all times and the further provision of a spring biased latch device having camming surfaces which cause a momentary displacement of the latch away from an interfering position and against the urging of the bias means when the outer traveler is immediately proximate the inner traveler. Once the inner and outer travelers are fully "aligned" the latch automatically snaps into the interfering position thereby to lock the two travelers together for normal operation. Accordingly, there is no need whatsoever to carefully position either the door or one of the travelers relative to one another to reengage the system after it has been manually disengaged. Rather, one can simply energize the operator in either direction to automatically effect a reengagement of the system.

A further feature of the invention is the configuration and construction of the rail itself so as to provide a channel for the disposition of the screw shaft, an oppositely extending flange to define on the inner surfaces thereof inner traveler track, and on the outer surfaces thereof an outer traveler track, and a provision for accommodating the necessary mechanical interconnection between the outer traveler and the screw shaft for travel of the traveler assembly over the entire length of the rail. In general, this is accomplished by means of an integral rail of extruded aluminum or the like having a section defining a stiffening web, an open bottom cylindrical channel, and, beneath said channel, a pair of oppositely outwardly extending U-shaped flanges, the fingers of which are spaced apart to provide the vertical opening to the screw shaft channel and defining by means of interior and exterior surfaces the inner and outer traveler tracks, respectively.

A still further feature of the invention is the provision of a substantially rigid guide rail having a screw shaft channel and a liner disposed within the screw shaft channel, mediate the screw shaft and the interior surface of the channel, and of such configuration as to accommodate a wide range of tolerances in the screw shaft and rail to provide long life and smooth, silent operation.

Other features and advantages of the invention will become apparent from a reading of the following detailed specification of an illustrative embodiment of the invention.

BRIEF DESCRIPTION OF THE DRAWINGS

FIG. 4 is a sectional view of the apparatus of FIG. 2 showing the latch device in several positions;

FIG. 5 is an axially cross-sectional view of the apparatus of FIG. 4 along with section line 5—5;

FIG. 6 is an enlarged sectional view of the screw shaft, channel, and liner of FIG. 5 illustrating the configuration of the liner in detail; and, FIG. 7 is a partially diagrammatic side view of the latch and camming surfaces operative during the automatic reconnection of the traveler assembly of FIG. 5.

DETAILED DESCRIPTION OF THE SPECIFIC EMBODIMENT

Figure 1:
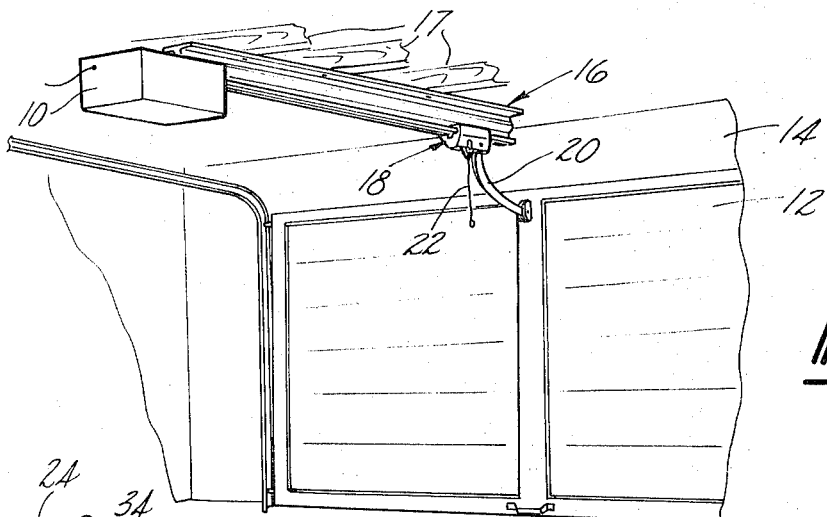
FIG. 1 is an environmental view of an illustrative embodiment of the invention as applied to the opening and closing of a garage door.

FIG. 1 shows a power-drive operator having a motor housing 10 mounted adjacent the ceiling of a garage or similar structure for opening and closing a one-piece rigid overhead door 12. Door 12 is mounted within a conventional door opening defined by structural portion 14 of the garage. The power drive assembly for the operator includes an elongated rigid rail 16 which is secured to ceiling rafters 17 by conventional means such as screws, straps and the like to define a path of travel for traveler assembly 18. As the motor (not shown) in housing 10 rotates, the traveler assembly 18 is caused to be displaced along the rail 16 between limits of travel which correspond to the fully opened and fully closed positions of the door 12. Traveler assembly 18 is substantially permanently connected to door 12 by means of rigid pivot arm 20. However, the various portions of the traveler assembly 18, as hereinafter described, may be operatively disconnected from one another for manually raising and lowering the door 12 simply by appropriate manipulation of a latch, this manipulation being most expeditiously carried out by means of a pull cord 22.

Looking now to FIGS. 2 through 7 of the drawings, the specific details of the rail 16 and the traveler assembly 18 will be described. Rail 16 is preferably an integral extrusion of aluminum having an upper stiffening web 24, a substantially cylindrical but open-bottom screw shaft channel 26 and, immediately thereunder, oppositely outwardly extending U-shaped track flanges 28 and 30 which define inner and outer traveler track surfaces for the traveler assembly 18 as hereinafter described. It will be noted that the fingers of the track flanges 28 and 30 are spaced transversely apart so as to provide a vertical opening through to the screw shaft 32 which is rotatably disposed within the channel 26. A self-lubricating, polymeric or spring steel bearing liner 34 is disposed mediate the screw shaft 32 and the interior surface of the channel 26 as hereinafter described in greater detail with reference to FIG. 6. Screw shaft 32 is driven in alternate directions by means of the motor in the housing 10 to cause bidirectional travel of the traveler assembly 18 along the rail 16 for the purpose of opening and closing the door 12. Door 12 is shown closed in FIG. 1.

Traveler assembly 18 comprises an inner traveler 36 shown in FIGS. 3, 4, 5, and 7 having oppositely extending flat track arms 38 and 40 which are disposed within and substantially fully enclosed by the oppositely extending track flanges 28 and 30. Inner traveler 36 is formed to exhibit a vertically oriented opening 42 having a central portion which extends fully vertically therethrough for purposes hereinafter described. The longitudinally extreme portions of opening 42 extend only partially through the traveler body, thus, to define seats 43 for a half-nut 44, the upper edge of which is threaded so as to mesh with the threads of the screw shaft 32. The nut 44 is urged upwardly into engagement with the screw shaft 32 by springs 46 which are disposed in the preformed sockets of the inner traveler 36 as best shown in FIG. 4. The half-nut 44 is, thus, trapped and held against rotation whereby the rotation of the screw shaft 32 causes the nut to be displaced linearly along the rail 16. The mechanical interconnection between the nut 44 and the inner traveler 36, thus, causes the combination of the inner traveler and nut to operate as a unit displacing longitudinally along and within the oppositely extending track flanges 28 and 30 of the rail 16. The inner traveler assembly including the nut 44 is at no time disengaged from the shaft 32 for purposes of manually opening or closing the door 12 as will be hereinafter described in greater detail.

Figure 2:
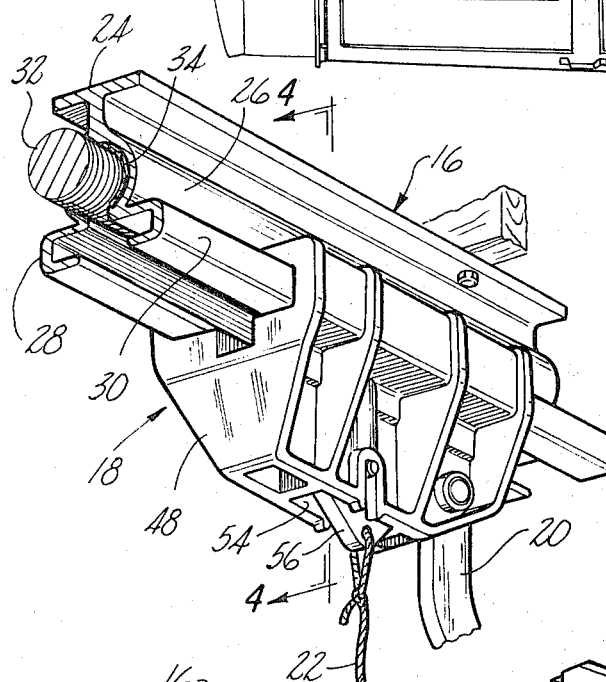
FIG. 2 is a perspective view of a guide rail, screw shaft, and manually releasable traveler assembly constructed in accordance with the invention.
Figure 3:
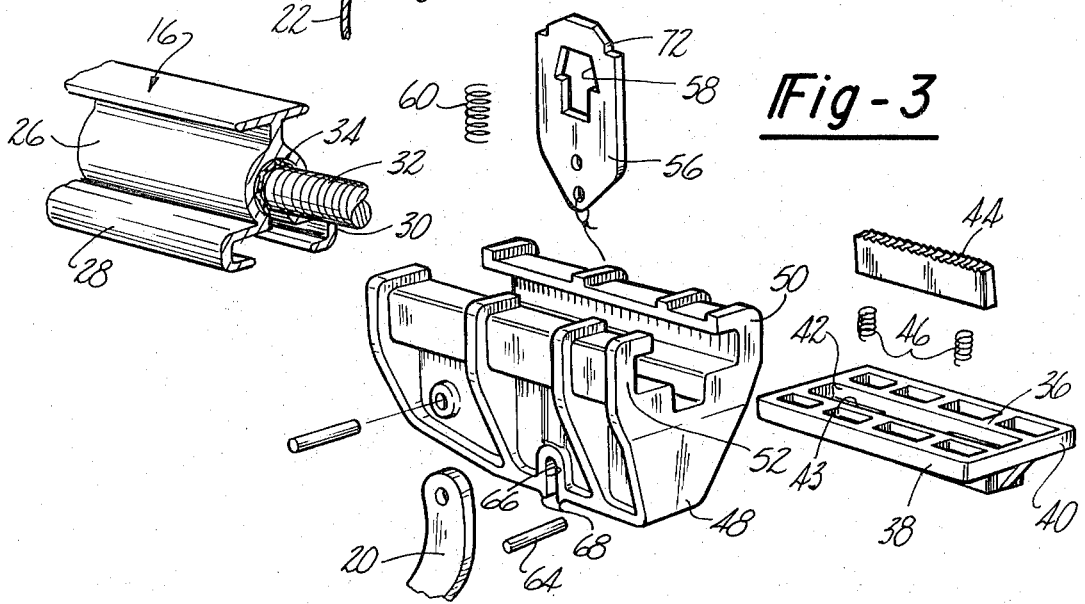
FIG. 3 is an exploded view of the components in the assembly of FIG. 2.

Traveler assembly 18 further includes an outer traveler body 48 permanently secured to the rail 16 by means of right and left upwardly and inwardly extending trolley arms 50 and 52 which engage the outer surfaces of the track flanges 28 and 30, as best shown in FIG. 2. The outer traveler 48 is, thus, capable of sliding over and fully past the inner traveler 36 in either direction along the rail 16, except when the inner and outer travelers 36 and 48, respectively, are locked together by means of a latch plate 56 which is disposed within an opening 54 in the outer traveler 48. The opening 54 of the outer traveler 48 is capable of being vertically aligned with the opening 42 of the inner traveler 36 so as to permit the latch plate 56 to be disposed in an interfering relationship with the inner traveler, thus, locking the inner and outer travelers together for joint displacement along the rail 16.

Latch plate 56 has formed therein a central aperture 58 which receives a compression spring 60 in trapped relation therein. The spring 60, as best illustrated in FIGS. 4 and 5, rests at the lower end on shoulders 62 which are formed within the opening 54 of the outer traveler body 48. The upper end of the spring 60 seats against the upper interior surface of the latch aperture 58 whereby the latch plate 56 is urged upwardly through the aligned openings in the outer and inner travelers. A pin 64 is securely held within a hole in the latch plate 56 and cooperates with the interior surfaces of a pin slot 66 to prevent the latch plate 56 from being urged upwardly beyond a predetermined limit.

Latch plate 56 may be thought of as having two vertically spaced positions, the uppermost position being that in which the plate extends into opening 42 of inner traveler 36 to interlock the inner and outer travelers 36 and 48, respectively, and the lowermost position being that which eliminates the interfering relationship between the latch and the inner traveler and, thus, permits the inner and outer travelers to be independently displaced along the rail 16. It is, of course, in this second or lowermost position of latch plate 56 that the door 12 may be manually operated. It is to be noted that manual operation of the door 12 does not require removal of the outer traveler 48 from the rail 16 nor does it require that the pivot arm 20 be in any way disengaged from its normal operative position between the door 12 and the body of the outer traveler 48.

It will be noted that the pull cord 22 is secured to the latch plate 46, as best shown in FIG. 2, to permit the user to pull the latch plate 46 downwardly against the bias of compression spring 60 until the latch plate surfaces 72 are no longer in interfering relation with the interior surface of the opening 42 in the inner traveler 36. The latch plate may be displaced vertically further until the roll pin 64 clears the bottom of the pin slot 66 and the roll pin 64 may then be urged over the nibs 68 adjacent the pin slot 66 and on the bottom of the outer traveler body 48. This detent action locks the latch plate 56 in the lowered position. It will be noted that the inner surfaces 70 of the opening 54 are flared outwardly toward the bottom, i.e., tapered, to accommodate a pivotal movement of the latch plate 56 to a sufficient degree to allow the pin 64 to be passed over one or the other of the sets of nibs 68. In this position, the latch plate remains in the lowermost position to free the outer traveler for independent displacement along the rail 16 irrespective of the position of the inner traveler 36.

Latch plate 56 is constructed to exhibit beveled camming surfaces 74 on the leading and trailing edges thereof, as best shown in FIG. 4. Moreover, the inner traveler 36 exhibits correspondingly tapered camming surfaces 76 such that relative displacement between the inner traveler and the outer traveler which carries the latch plate 56 results in engagement of the tapered camming surfaces 74 and 76, as best shown in FIG. 7. Continued relative displacement after engagement of the camming surfaces 74 and 76 causes the depression or vertical displacement of the latch plate 56 against the bias of the spring 60 to permit the inner traveler 36 to pass over the latch plate 56 and through the outer traveler 48 until the openings 54 and 42 in the outer and inner travelers, respectively, are aligned. At this time, the latch plate 56 snaps back into the uppermost position, (assuming the pin 64 is not locked behind one of the sets of nibs 68) thus, reuniting the inner and outer travelers for common displacement along the rail 16. The degree of depression or vertical displacement of the latch plate 56 necessary to accomplish this reconnection is less than the full vertical displacement required to clear the pin 64 beyond the nibs 68 and, accordingly, there is no possibility that the automatic reengagement process will lock the latch plate 56 in the lowermost position.

It can be seen from the foregoing description that the operative reconnection of the door 12 to the traveler assembly 18 is easily accomplished simply by, first, releasing the latch plate to movement toward the uppermost or locking position and, second, energizing the operator to displace the inner traveler 36 along the rail 16 toward the outer traveler 48. The two travelers will reunite regardless of the position of the door, either partly or fully open or closed, and will thereafter function in the normal manner.

Looking now to FIG. 6, the details of the screw shaft channel 26 and the liner 34 which is disposed mediate the screw shaft 32 and the channel 26 will be described. Liner 34 is preferably made of a resilient, self-lubricating material, such as any one of the various polymeric materials now well known and is disposed continuously within the rails 16 over the entire length thereof so as to act as a bearing for the screw shaft 32. The liner may also be made of spring steel, or the like. Liner 34 is characterized by a plurality of contiguous straight wall sections 78 and circumferentially spaced longitudinal ridges 80 which engage the inner surface of the screw shaft channel 26. The rail 16 has longitudinally continuous lips 82 formed therein adjacent the vertical opening which receives the half-nut 44 so as to prevent rotation of the liner 34 with the shaft 32 as it turns.

The liner 34 is dimensioned so as to form a "line-to-line" contact with the screw shaft 32 for the combination of a screw shaft of minimum tolerance and an interior shaft channel 26 dimension of maximum tolerance. As the interior dimension of the shaft channel 26 decreases toward the minimum tolerance and the external thread diameter of the shaft 32 increases toward the maximum tolerance, the normally straight wall sections 78 of the liner 34 expand or bow out resiliently so as to accommodate the size change. This combination of a bearing liner within an extruded aluminum screw shaft channel 26 has been found to be very effective in increasing the operative life of the assembly and, more importantly, in substantially reducing noise and the need for lubricants of various types. The elimination of the need for grease-type lubricants eliminates the danger of dripping of such lubricants onto the automobiles which are normally stored within the garage structure 14.

It can be seen that in normal operation the latch plate 56 is disposed in the uppermost position with the roll pin 64 well up within the pin slot 66. In this position, the interfering surfaces 72 of the latch plate 56 are within the opening 42 of the inner traveler 36 to cause the inner and outer travelers 36 and 48, respectively, to move together whenever the screw shaft 32 is rotated; the direction of movement being dependent upon the direction of rotation of the screw shaft 32. In the event of a power failure or other malfunction of the operator 10, the user pulls the cord 22 to compress the spring 66 by vertical displacement of the latch plate 56. The latch plate 56 is displaced vertically until the roll pin 64 can clear one of the nibs 68 whereupon the latch plate is locked in the lowered position. In this lowered position, the latch plate is fully out of engagement with the inner traveler 36, thus, to permit the door 12 and the outer traveler 48 in engagement with the rail 16 to be independently displaced for the purpose of manually opening and closing the door. This manual operation is possible even if the power failure occurs with the inner traveler 36 somewhere in the intermediate or even fully opened position of the door 12 relative to the garage door opening 14. After power is restored, the latch plate 56 is allowed to be displaced by the spring 60 back to the uppermost position and the operator 10 is actuated in the normal fashion. As the inner and outer travelers come together, the camming surfaces 74 and 76 push the latch plate downwardly momentarily until the inner and outer traveler openings 42 and 54, respectively, are aligned. At this time the latch plate 56 snaps upwardly to lock the two travelers back together.

It is to be understood that the invention has been described with reference to specific and illustrative embodiments thereof and, accordingly, the foregoing description is not to be construed in a limiting sense.

The embodiments of the invention in which an exclusive property or privilege is claimed are defined as follows:

1. Apparatus for interconnecting a movable load and a power source for bidirectional displacement of the load along a predetermined path of travel comprising: a substantially rigid rail extending along the predetermined path and defining a screw shaft channel, an inner track internally of the rail, and an outer track externally of the rail; a screw shaft in the channel and connected to a power source for bidirectional rotation; an inner traveler nonrotatably disposed within the inner track and having means substantially permanently engaging the screw shaft such that rotation of the shaft causes linear displacement of the inner traveler along the predetermined path; and outer traveler disposed on the outer track for displacement therealong; means for connecting the outer traveler to the load whereby displacement of the outer traveler results in displacement of the load; the outer traveler being configured to be relatively displaceable over and past the inner traveler in either direction along the predetermined path; and latch means carried by the outer traveler and selectively displaceable between a first position in interfering engagement with the inner traveler wherein the inner and outer travelers are locked together for mutual displacement along the predetermined path and a second position out of interfering engagement with the inner traveler whereby the inner and outer travelers are free for displacement relative to one another along the predetermined path.

2. Apparatus as defined in claim 1 including bias means for urging the latch means into the first position.

3. Apparatus as defined in claim 2 wherein the inner and outer travelers each have formed therein an opening extending perpendicular to the screw shaft axis, the latch means comprising a rigid member disposed commonly in the openings and maintaining alignment thereof when in the first position.

4. Apparatus as defined in claim 3 wherein the latch means includes a rigid plate having a substantially central aperture formed therein, the outer traveler having shoulders formed therein as a spring seat, a compression spring disposed within the aperture of the latch plate and resting on said spring seat thereby to bias the latch plate toward the inner traveler.

5. Apparatus as defined in claim 4 wherein the opening of the outer traveler which receives the latch plate is provided with reversely outwardly tapering walls to permit limited pivotal displacement of the latch plate relative to the outer traveler and about a transverse axis when in the second position, and means for maintaining the latch plate in the second position against the force of the spring.

6. Apparatus as defined in claim 5 wherein said last mentioned means includes a pin rigidly connected to and transversely extending from the latch plate and detent means on the outer traveler and cooperating with the roll pin for securement of the latch in the second position.

7. Apparatus as defined in claim 3 wherein the latch member and the inner traveler have complementary camming surfaces formed thereon to produce displacement of the latch member from the first toward the second position when the inner and outer travelers are displaced toward one another to a proximate position whereby the automatic latching of the inner and outer travelers is effected.

8. Apparatus as defined in claim 1 wherein the rail is constructed to define a pair of oppositely outwardly extending hollow flanges having an open undersurface to define a substantially vertically extending opening therebetween to the screw shaft channel along the entire longitudinal extent of the rail, the inner traveler being disposed substantially fully within and between the oppositely extending hollow flanges and the outer traveler being disposed in substantially surrounding relationship to said flanges and said inner traveler.

9. Apparatus as defined in claim 1 wherein the inner traveler comprises the combination of a substantially rectangular, flat traveler body disposed within the inner track and a half-nut carried by the traveler body and spring means for biasing the half-nut into meshing engagement with the screw shaft.

10. Apparatus as defined in claim 1 wherein the rail is configured to define an inner track of substantially rectangular cross section, the inner traveler comprising a body having a substantially rectangular cross section which is complemental to the rectangular cross section of the inner track and disposed therein for longitudinal displacement along the rail, the body having formed therein a vertical rib defining a vertically extending aperture, a seat within the aperture, a half-nut disposed on the seat and within the aperture, at least one spring socket adjacent the seat, a spring disposed in the socket and bearing against the nut for urging the nut into engagement with the screw shaft when the inner traveler is disposed within the inner track.

11. Apparatus as defined in claim 10 wherein the outer traveler comprises a body having oppositely upwardly and inwardly extending lateral arms surrounding and engaging the outer track of the rail and defining a channel within which the track portion of the rail is disposed whereby the outer traveler may pass freely over the inner traveler, said outer traveler body having formed therein a vertical opening which is alignable with the vertical opening of the inner traveler body, the latch means comprising a rigid latch plate disposed in the vertical opening of the outer traveler, and spring means for biasing the latch plate upwardly through the opening and into the opening of the inner traveler to form said interfering relationship.

12. Apparatus as defined in claim 1 including a substantially resilient liner bearing within the screw shaft channel and between the screw shaft and the inner surface of the channel.

13. Apparatus as defined in claim 1 wherein the load is an overhead garage door, said means for connecting the outer traveler to the load comprising an arm pivotally connected to the door.

14. In combination: a rigid rail defining a substantially cylindrical screw shaft channel having an open peripheral portion therein, a screw shaft disposed within the channel and closely spaced in relation thereto, a traveler assembly operatively associated with the rail for travel thereover and including a nut having a threaded edge extending through the open peripheral portion into meshing engagement with the screw shaft, and a substantially non-compressible but radially flexible liner bearing surrounding the screw shaft over substantially the entire length thereof and disposed mediate the screw shaft and channel.

15. Apparatus as defined in claim 14 wherein the channel has formed thereon a pair of lip ridges adjacent the open peripheral portion, the liner bearing being less than 360° in peripheral extension thereby to accommodate the meshing engagement of the nut with the screw shaft, the peripheral extremities of the liner bearing abutting the lip ridges to prevent turning thereof during rotation of the screw shaft.

16. Apparatus as defined in claim 14 wherein the liner bearing comprises a polygonal cross-sectional shape including a plurality of contiguous straight line wall sections and, on the exterior thereof, a plurality of longitudinally extending ridges mediate the wall sections and which are in engagement with the interior surface of the screw shaft channel.

17. In a garage door operator: a rail defining a screw shaft channel and a pair of oppositely extending hollow flanges, a first traveler disposed within the flanges and engaging the interior surfaces thereof for movement along the rail according to screw shaft rotation, a second traveler disposed over and engaging the exterior surfaces of the flanges for connection to a load, and manually engageable latch means for selectively interconnecting the first and second travelers.

18. Apparatus for interconnecting a movable load and a power source for bidirectional displacement of the load along a predetermined path of travel comprising: a substantially rigid rail extending along the predetermined path and defining an inner track internally of the rail and an outer track externally of the rail, an inner traveler comprising a substantially rectangular flat body disposed within the inner track and interconnected with said power source for longitudinal movement relative to the rail when said power source is actuated, an outer traveler disposed on the outer track for displacement therealong, means for connecting the outer traveler to the load whereby displacement of the outer traveler results in displacement of the load, the outer traveler being configured to be relatively displaceable over and past the inner traveler in either direction along the predetermined path, and latch means carried by the outer traveler and selectively displaceable between a first position in interfering engagement with the inner traveler whereby the inner and outer travelers are locked together for mutual displacement and a second position out of interfering engagement with the inner traveler whereby the inner and outer travelers are free for displacement relative to one another.

* * * * *